United States Patent Office 3,459,083
Patented Aug. 5, 1969

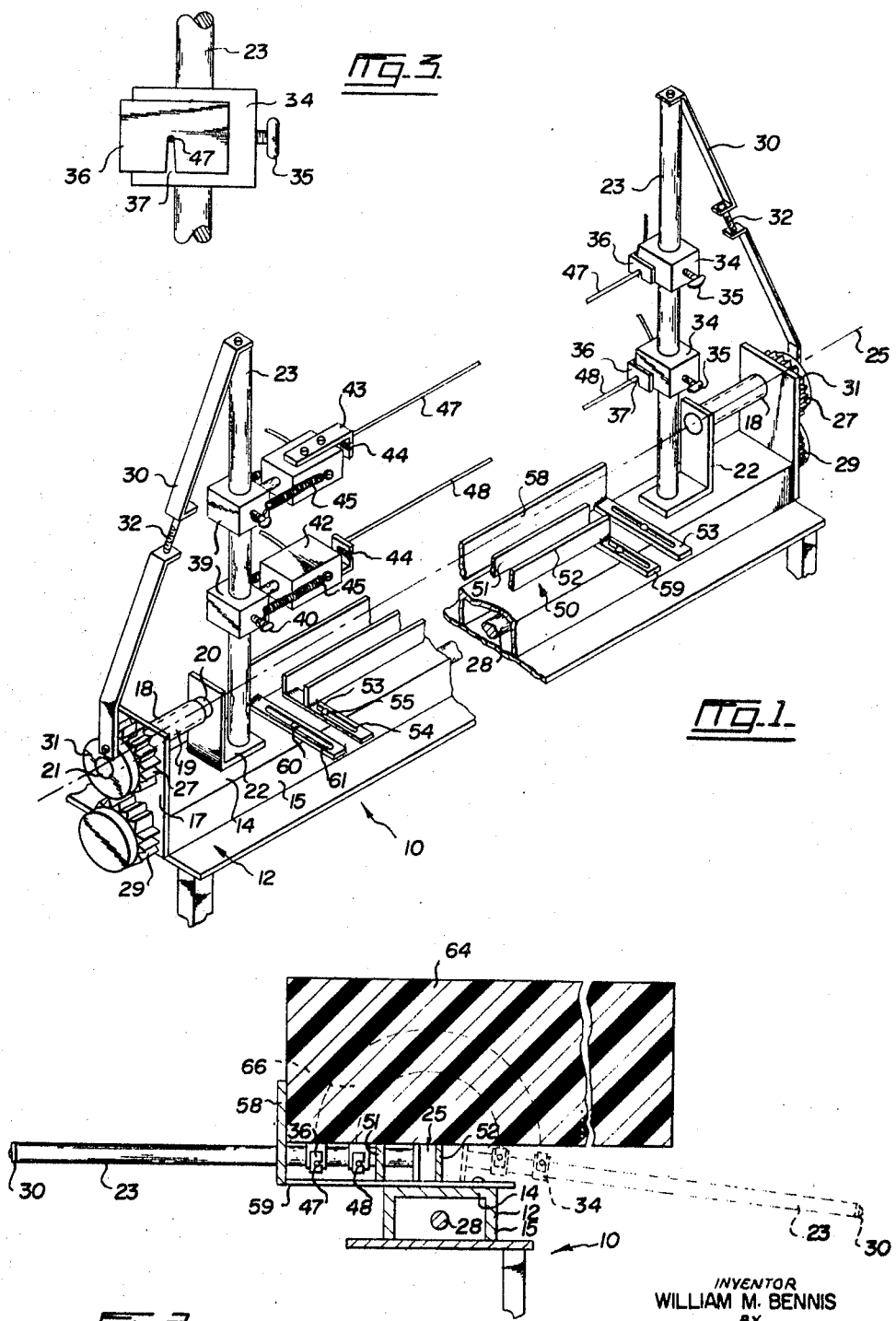

3,459,083
HOT WIRE CUTTING MACHINE
William M. Bennis, 4720 Fairlawn Drive, Burnaby,
British Columbia, Canada
Filed Feb. 27, 1967, Ser. No. 618,585
Int. Cl. B26d 7/10
U.S. Cl. 83—171                                   5 Claims

ABSTRACT OF THE DISCLOSURE

A machine having a base on which a pair of widely spaced arms are pivotally mounted for unitary swinging movement. Slides are mounted on the arms for adjustment lengthwise thereof, and heatable cutting wires extend between the slides. The arms are operated to swing the hot wires through an arc to cut through a plastic foam block supported on the base.

BACKGROUND OF THE INVENTION

This invention relates to a machine for cutting and shaping plastic materials and more particularly for forming pipe insulating sleeves.

A considerable number of thermoplastic materials are now available for a variety of uses and it is well known that these synthetics make extremely effective insulation. One such plastic material which is commonly used for this particular purpose is a porous polystyrene sold commercially under the trade name "Styrofoam." This foam material is available in large flattened sheets which are unsuitable for wrapping around pipe.

Normally foam material is cut and shaped by means of a hot wire cutter which utilizes a heated resistance wire as a cutting tool. Cutters of this type are available for fabricating a variety of articles but the cutting and shaping of the elongated annular bands best suited for wrapping pipe presents special difficulties which have not been overcome by known hot wire cutters.

SUMMARY OF THE INVENTION

The present invention comprises a base sufficiently long to support a foam block several feet in length. At each end of the base an arm is mounted for swinging movement transversely of the base. These two arms are coupled together for unitary operation so that as one is swung through a prescribed arc of travel, the other arm is moved exactly and simultaneously through the same arc. Mounted on the two arms are resistance wires of the hot wire cutting type. The wires are adjustable lengthwise of the arms and as the arms are swung through their arcs of travel, the heated wires burn through the foam block on the base and form a half cylindrical sleeve of the required thickness. The sleeve thus cut is uniformly semi-circular in cross section throughout the entire length of the sleeve and can be applied directly to the pipe without the need for further hand trimming or fitting. The machine can quickly and easily be adjusted to cut pipe insulation of various thicknesses and to do so in a manner which will not cause unnecessary waste of the plastic foam material.

BRIEF DESCRIPTION OF THE DRAWINGS

FIGURE 1 is a perspective view of the invention, part broken away, and showing the machine as it would appear midway through its cutting stroke.

FIGURE 2 is a transverse section taken on the line 2—2 of FIGURE 1 and showing the machine at the start of its cutting stroke with a block to be cut in place, and FIGURE 3 is a detail view of a slide fitted with a terminal clip.

DESCRIPTION OF THE PREFERRED EMBODIMENT

Referring to the drawings, the numeral 10 indicates a table or other suitable work platform on which the present hot wire cutting machine is adapted to be mounted.

The machine itself consists of a base 12 which preferably is formed of a length of inverted channel to provide a top wall 14 and side walls 15. Secured to the ends of the horizontally disposed base 12 are vertical plates 17 on which horizontal sleeve bearings 18 are mounted. The aligned sleeve bearings 18 are spaced a short distance above the top wall 14 of the base, and each bearing is fitted with a spindle 19. The inner ends 20 of the spindles 19 overhang the free ends of the bearings 18, and the outer ends 21 of said spindles project through the vertical plates 17.

L-shaped brackets 22 are secured to the ends 20 of the spindles 19, and carried by these brackets are a pair of cylindrical arms 23. The arms 23 are parallel to one another and are supported by their spindles to swing in planes disposed at right angles to the longitudinal axis of the base 12 and parallel to each other. To swing the arms 23 in this manner, the spindles 19 rotate about a common axis 25 which is shown by a chain dotted line in FIGURE 1 and by a cross in FIGURE 2. The axis 25 is parallel to the longitudinal axis of the base 12.

The outer ends 21 of the spindles are fitted with gears 27. A rod 28 is suitably journalled in the base 12 and the opposite ends of this rod are provided with gears 29 which mesh with the gears 27. It will be noted the gears 27 and 29 are of the same diameter and have a similar number of teeth so as to give a one to one drive between the spindles 19 and the rod 29. Thus, as one arm 23 is swung from one side of the base to the other, exactly the same motion is imparted to the other arm. In order to keep the arms 23 rigid, said arms are fitted with reinforcing braces 30. The diagonally extending braces 30 connect the outer ends of arms to bosses 31 formed on the adjacent gears 27. Preferably the braces 30 are made up of two parts which are connected together by means of adjusting bolts 32, see FIGURE 1 only.

Mounted on the right arm 23, as viewed in FIGURE 1, is a pair of slides 34 which are provided with clamping screws 35. The slides 34 can be moved individually endwise of the arm and locked in any selected position thereon by means of the screws 35. Terminal clips 36 are carried by the slides 34 and the free end of said clips are provided with wedge-shaped slits 37, see particularly FIGURE 3.

The left arm 23 of FIGURE 1 has a pair of slides 39 provided with clamping screws 40. Horizontally extending pins 41 are secured to the slides 39 and slidably mounted on these pins are insulators 42. The insulators 42 have terminal clips 43 provided with wedge-shaped slits 44. Pairs of springs 45 connect the insulators 42 to the slides 39 and exert a force tending to move said insulators along the pins 41 towards the adjacent arm 23.

The several parts mounted on the arms 23 serve to support outer and inner wires 47 and 48 respectively. Both these wires are wedged in the slits 37 and 44 and are kept taut by means of the springs 45. The resistance wires 47 and 48 are electrically connected by suitable circuits (not shown) to a source of power and when current is fed to the wires, said wires become heated to a temperature sufficiently high to burn through cellular plastic material.

A support member 50 is fitted to the base 12, this member being made up of two vertically disposed ribs 51 and 52 extending longitudinally of the base. The transversely spaced and parallel ribs 51 and 52 are provided at opposite ends thereof with laterally extending legs 53 in which slots 54 are formed. Set screws 55 extend through the slots 54 and into the top wall 14 of the base. The top edges of the ribs 51 and 52 are disposed substantially in the same horizontal plane as the axis 25 of the spindles, see FIGURE 2.

Extending parallel to the member 50 along one side of the base 12 is a vertical fence 58. Like the support member 50, the fence has legs 59 at opposite ends thereof, and set screws 60 project through slots 61 in these legs to adjustably secure the fence to the base. The fence 58 is higher than the ribs of the member 50 or, in other words, extends above the common axis 25 of the spindles 19.

The present machine is intended for use in cutting insulating strips from foam blocks 64, see FIGURE 2. Assuming that the pipe to be insulated has an outside diameter of 4 inches and the insulation is required to be 1 inch thick, then the block 64 selected would likely be 4 inches thick, 14 inches wide and some 3 feet or more in length. To provide insulation for such a pipe, the outer wire 47 is positioned 3 inches from the axis 25. Inner wire 48 is positioned 2 inches from the same axis. The arms 23 are swung to the solid line position of FIGURE 2 and the set screws 55 and 60 are temporarily loosened to permit adjustment of the member 50 and the fence 58. As shown in FIGURE 2, the fence 58 is positioned just outside the wire 47. The rib 51 of the support member is located a short distance inside the wire 48. Both wires are then heated to the required temperature and the machine is ready to cut.

The machine operator stands near the table 10 facing the side of the base 12 opposite the arms 23 and in this position places the block 64 in the machine. The side of the block nearest the operator is supported by hand while the opposite side rests on the support member 50 in engagement with the fence 58. With his other hand, the operator grasps one of the arms 23 and pulls it towards him through an arc of about 200°. As this movement takes place, the wires 47 and 48 burn their way through the foam block and in doing so cut from the block an annular strip 66, indicated by broken lines in FIGURE 2, which strip is approximately 180° in circumference.

The strip and the waste material are removed from the machine and the arms 23 are returned to their original position. The block is turned over and again placed on the member 50 with the uncut side of said block abutting the fence 58. By again pulling on one arm 23, both arms will swing in unison to draw the heated resistance wires through the foam material.

Thus, two 180° strips are cut from the block 64. The inside diameter of each strip cut is 2 inches and the outside diameter is 3 inches. When two such strips are placed edge to edge around a 2 inch outside diameter pipe, they form a 1 inch thick insulating sleeve which completely encloses the pipe.

A single operator using the present machine can quickly and easily produce large quantities of pipe insulation, with little wastage of the foam material. The half sleeves can be applied to the pipe as they come from the machine and without further hand trimming, thus effecting a corresponding saving in labor costs. It is a simple matter to adjust the machine to cut strips of various thicknesses and also strips can be cut which taper from one end to the other. This is accomplished by positioning the wires 47 and 48 so that they are at an angle to the axis 25 whereupon the half sleeve cut by the angularly disposed wires will be correspondingly tapered.

The hot wire cutting machine need only have one resistance wire to cut many articles, for example, a single wire only would be required to cut a half cylinder from an elongated block of foam material.

If desired, the arms 23 can be swung through their arcs of travel by power driven means. This could be done, among other ways, by use of a small electric motor having a pinion mounted on the motor shaft and meshing with one of the gears 29.

I claim:

1. A hot wire cutting machine comprising an elongated horizontal base, longitudinally aligned bearings mounted one at each end of the base, a spindle mounted in each bearing, an arm secured at one end to each spindle and being disposed at right angles to said spindle, a rod journalled in the base parallel to the spindles, a first gear secured to each end of the rod, a second gear secured to each spindle in mesh with an adjoining first gear, said arms each having slides, means for adjusting each slide lengthwise of the arm, said slides on one of the arms having a terminal clip, said slides on the other arm each having an inwardly projecting pin, an insulator slidably mounted on each pin, a terminal clip carried by each insulator, resistance wires connected to the aforementioned terminal clips and to an electric power source, and spring means connecting each insulator to an adjacent slide to apply tension to one of the resistance wires.

2. A hot wire cutting machine as claimed in claim 1, a support member extending longitudinally of the base between the arms, said support member having an upper edge substantially coplanar with the axis of rotation of the spindles, a vertical fence spaced from and extending parallel to one side of the base, and adjustable means mounting the vertical fence on the base for parallel movement towards and away from the support member.

3. A hot wire cutting machine as claimed in claim 2, said second gears each having an outer boss, a diagonal brace securing each outer boss to an adjoining arm, and means for adjusting the length of each diagonal brace.

4. A hot wire cutting machine comprising a base, a pair of widely spaced arms mounted on the base for unitary swinging movement about a common axis of rotation extending parallel to the base, a resistance wire extending between the arms and adapted to be electrically connected to a power source, a fence extending parallel to the common axis of rotation of the pair of arms, means adjustably securing the force to the base for lateral movement relative to said axis of rotation, a support member mounted on the base, said fence and said support member co-operating to support a block of foam material between the arms and in the path of the heated resistance wire to be cut thereby as the pair of arms are swung about their common axis of rotation, said support member having a block supporting edge substantially coplanar with the axis of rotation of the pair of arms.

5. A hot wire cutting machine as claimed in claim 4, and means for adjusting the support member towards and away from the fence.

References Cited

UNITED STATES PATENTS

| | | | |
|---|---|---|---|
| 3,018,355 | 1/1962 | Wallerstein | 83—171 |
| 3,131,278 | 4/1964 | Rosenthal | 83—171 X |
| 3,338,122 | 8/1967 | Lampe | 83—171 X |

FOREIGN PATENTS

| | | |
|---|---|---|
| 548,727 | 9/1956 | Italy. |
| 805,836 | 12/1958 | Great Britain. |
| 815,146 | 6/1959 | Great Britain. |
| 932,545 | 7/1963 | Great Britain. |

FRANK T. YOST, Primary Examiner

U.S. Cl. X.R.

83—467